Feb. 8, 1966   H. R. HENDERSON   3,234,317
SWIVEL COUPLING FOR A COMBINED FLUID CONDUIT AND ELECTRIC CABLE
Filed June 12, 1963   2 Sheets-Sheet 1
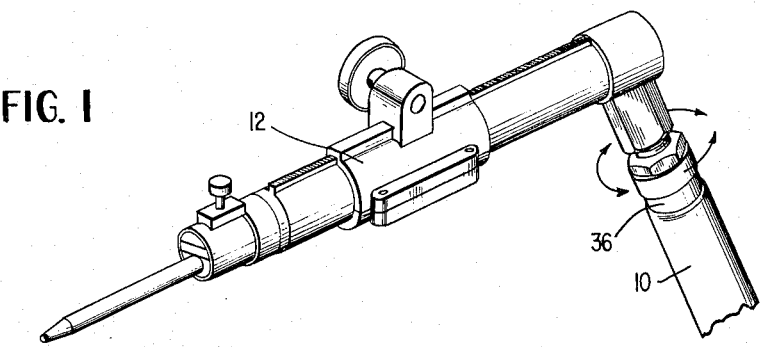
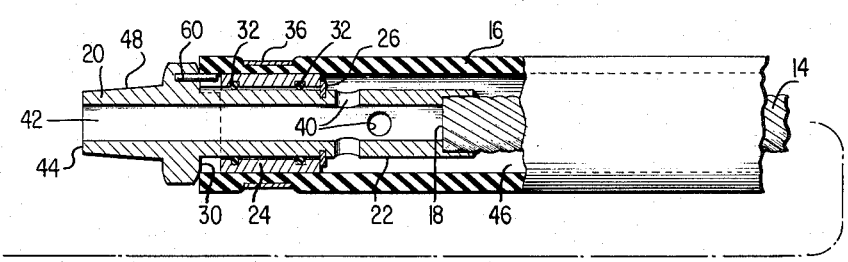
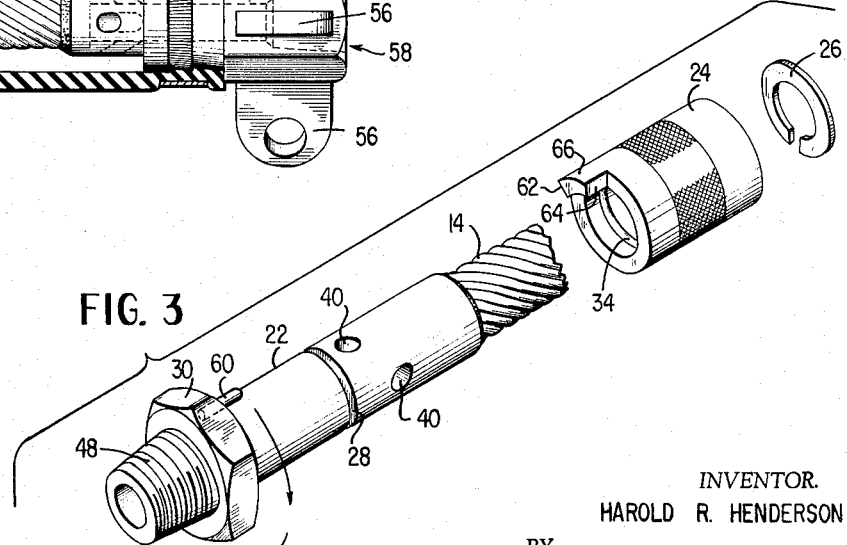
INVENTOR.
HAROLD R. HENDERSON
BY
*Browne, Schuyler, & Beveridge*
ATTORNEYS.

Feb. 8, 1966 H. R. HENDERSON 3,234,317
SWIVEL COUPLING FOR A COMBINED FLUID CONDUIT AND ELECTRIC CABLE
Filed June 12, 1963 2 Sheets-Sheet 2

INVENTOR.
HAROLD R. HENDERSON
BY
ATTORNEYS.

United States Patent Office 3,234,317
Patented Feb. 8, 1966

3,234,317
SWIVEL COUPLING FOR A COMBINED FLUID
CONDUIT AND ELECTRIC CABLE
Harold R. Henderson, Lancaster, Ohio, assignor to Arcair
Company, Bremerton, Wash., a partnership
Filed June 12, 1963, Ser. No. 287,437
6 Claims. (Cl. 174—15)

This invention relates to swivel couplings, and more particularly to a swivel coupling for use with a concentric fluid conduit and electric cable.

The use of a combined fluid conduit and electric cable, hereinafter called a concentric cable, is common in many industrial operations, particularly where it is desirable to transmit relatively large amounts of electric energy while maintaining the size of the conductor at a minimum. By placing the electric cable within the conduit, the conduit may serve as an electrical insulator for the cable and fluid passing through the conduit will cool the conductor and thereby increase its current carrying capacity.

While the above construction enables a substantial reduction in size of the conductor by reducing its operation temperature, the resultant structure is relatively rigid, particularly in torsion due to the inherent torsional rigidity of the fluid conduit under pressure. When used with associated equipment which must be freely manipulated as, for example, the cutting and gouging torch shown in U.S. Patent No. 2,903,554 or 2,706,236, this torsional rigidity has seriously interfered with the efficient operation of the equipment.

Accordingly, it is an object of this invention to provide a swivel coupling for use with concentric cable which will eliminate the adverse effect of the torsional rigidity of the fluid conduit.

It is a further object of this invention to provide a swivel coupling for concentric cable which permits relative rotation between the fluid conduit and associated equipment connected thereto.

It is another object of this invention to provide a concentric cable having an improved coupling which permits relative rotation between the fluid conduit and the electric conductor.

In the attainment of the foregoing and other objects, an important feature of the invention resides in the employment of a cylindrical sleeve clamped within the end of the fluid conduit and rotatably mounted on the body of a terminal member to permit relative rotation between the fluid conduit and the electric cable. The electric cable is positioned concentrically within a flexible conduit and has one end secured to one end of an elongated terminal member having a cylindrical outer surface over a portion of its length. The cylindrical sleeve is rotatably mounted on the cylindrical surface and spaced from the end of the terminal member to which the cable is secured. The end of the flexible conduit is placed over the cylindrical sleeve and clamped in fluid-tight relation. A fluid passage extends from the end of the terminal assembly to communicate with the space between the cable and the conduit.

Other objects and advantages of this invention will become apparent by reference to the following specification taken in conjunction with the accompanying drawings, in which:

FIG. 1 is a perspective view of a concentric cable operatively connected to a cutting and gouging torch by a swivel coupling according to this invention.

FIG. 2 is a side view in partial section showing a concentric cable employing a swivel coupling according to the invention.

FIG. 3 is an exploded perspective view of the swivel coupling according to the invention.

Figure 4:
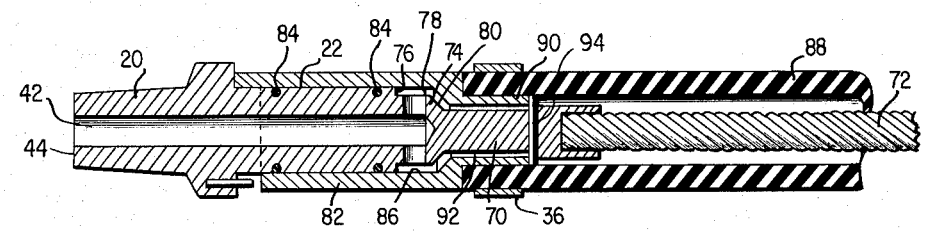
FIG. 4 is a view similar to FIG. 2 showing an alternate construction of a coupling according to the invention.

Referring to the drawings, a concentric cable according to the present invention, designated generally by numeral 10, is shown mounted on an electric arc-gas jet cutting and gouging torch 12. Concentric cable 10 includes an elongated, flexible cable conductor 14 disposed within an elongated flexible fluid conduit 16. Fixedly secured to one end 18 of cable 14, as by brazing, is an elongated hollow terminal member 20 having a cylindrical outer surface 22 extending over a portion of its length. A cylindrical sleeve 24, having an outside diameter substantially equal to the inside diameter of conduit 16, is mounted on cylindrical surface 22 and retained against axial movement by snap ring 26 positioned in groove 28 and by radially extending shoulder 30 on member 20. A fluid-tight seal is formed between sleeve 24 and surface 22 by O rings 32 seated in grooves 34 of sleeve 24. Sleeve 24 is retained within the end of fluid conduit 16, in fluid-tight relation, by hose clamp 36.

A plurality of drilled passages 40 extend radially from the hollow center 42 to the outer surface 22 of member 20 at points between groove 28 and end 18 of cable 14, thereby defining a fluid passage from end 44 of terminal member 20 to the space 46 between the fluid conduit 16 and the cable 14. Means, such as threads 48, is provided for connecting the terminal member to associated apparatus such as torch 12.

The opposite end of the concentric cable may be provided with a terminal member as described or, alternatively, the cylindrical sleeve may be eliminated and the fluid conduit 16 secured, as by clamp 50, directly to an enlarged shoulder 52 of terminal member 54. Terminal member 54 may be provided with a fluid inlet, indicated generally at 58, and a plurality of tabs 56 for securing electrical leads (not shown).

In order to minimize the resistance of terminal member 20 to torsional movement, cable 14 is preferably a bunched rope lay cable with the lay being equal to approximately five and one-half times the diameter of the cable.

To prevent unlaying of cable 14 by continued or excessive rotation of terminal member 20 with respect to conduit 16, a pin member 60 is provided on shoulder 30 in position to engage the sides 62, 64 of an axial projection 66 of sleeve 24. This is most readily seen in FIGURE 3 where it is apparent that relative rotation of sleeve 24 with respect to terminal member 20 will be limited to something less than 360° depending upon the size of the pin 60 and projection 66.

FIGURE 4 illustrates an alternate embodiment of the invention adapted to be used where smaller conduits and conductors may be satisfactorily used, as with small hand operated torches which must be freely maneuverable. In this embodiment, terminal member 20 is provided with an axially extending portion 70 having a diameter substantially smaller than the diameter of cylindrical surface 22, and having its end fixedly secured, as by brazing, to the end of cable 72. A transition section 74 joins portion 70 to cylindrical surface 22, and includes a first radial shoulder 76 extending inwardly from surface 22 to a cylindrical surface 78 having a diameter intermediate that of surface 22 and portion 70, and a second shoulder 80 extending between surface 78 and portion 70.

Sleeve 82 is rotatably mounted on terminal member 20, and a pair of O rings, mounted in grooves 84, provide a fluid-tight seal between surface 22 and internal cylindrical surface 86 of sleeve 82. To permit the use of a smaller conduit 88, sleeve 82 is provided with an axially extending portion 90 having a reduced internal diameter slightly larger than the diameter of portion 70 to provide an air passage 92 therebetween, and an external diameter substantially equal to the internal diameter of conduit 88. Hose clamp 36 retains conduit 88 on reduced portion 90 of sleeve 82 in fluid-tight relation. A roll pin 94 extending through portion 70 retains sleeve 82 on terminal member 20. A fluid passage 42 extends into terminal member 20 from end 44 and communicates with fluid passage 92.

From the above, it is apparent that the torsional rigidity of the fluid conduit will not affect the torsional resilience of the terminal member 20 within the limits permitted by stop members 60 and 66. Accordingly, a concentric cable constructed according to this invention permits excellent maneuverability of apparatus attached thereto.

While I have described and illustrated a preferred embodiment of my invention, I wish it to be understood that I do not intend to be restricted solely thereto, but that I do intend to cover all embodiments thereof which would be apparent to those skilled in the art and which come within the spirit and scope of my invention.

What is claimed is:

1. A swivel coupling for use with a concentric cable including a torsionally resilient electric cable disposed coaxially within a flexible fluid conduit, comprising, an elongated terminal member of electrical conductive material, means fixedly securing one end of said terminal member to the end of the electric cable, means rotatably connecting said terminal member to the end of the fluid conduit and forming a fluid seal therebetween at a point spaced along said terminal member from said one end, said rotatable connection permitting rotation of said terminal member and the electric cable secured thereto relative to the fluid conduit, and passage means extending through said terminal member from a point spaced from said fluid tight seal in the direction of said one end to the end thereof opposite said one end to provide fluid passage from said fluid conduit through said terminal member.

2. A swivel coupling for use with a concentric cable including a torsionally resilient electric cable disposed coaxially within a flexible fluid conduit, comprising, an elongated terminal member of electrical conductive material having a cylindrical outer surface over a portion of its length, means fixedly securing one end of said terminal member to said electric cable, a cylindrical sleeve rotatably mounted on said cylindrical surface in fluid tight relation and spaced from said one end of said terminal member, means fixedly securing said flexible fluid conduit to said sleeve in fluid tight relation, said terminal member and said electric cable being rotatable relative to said cylindrical sleeve and said flexible fluid conduit, and passage means extending through said terminal member from the end thereof opposite said one end through said cylindrical surface at a point between one end and said cylindrical sleeve to provide a fluid passage from said flexible fluid conduit through said terminal member.

3. A swivel coupling for use with a concentric cable including a torsionally resilient electric cable disposed coaxially within a flexible fluid conduit, comprising, an elongated terminal member of electrical conductive material having a cylindrical out surface extending over a portion of its length, means fixedly securing one end of said terminal member to said electric cable, a cylindrical sleeve rotatably mounted on said cylindrical surface, means fixedly securing said fluid conduit to said cylindrical sleeve in fluid tight relation to permit said terminal member and the electric cable secured thereto to rotate relative to said cylindrical sleeve and the fluid conduit secured thereto, passage means formed in said terminal member extending from the end opposite said one end and communicating with said fluid conduit to provide fluid passage from said conduit through said terminal member, and means limiting relative rotation between said sleeve and said terminal member.

4. A concentric cable comprising a hollow fluid conduit of electrical insulating material, a torsionally resilient electrical conductor disposed within said conduit, said conduit having an inside diameter greater than the outside diameter of the electrical conductor to define a fluid passage therebetween, an elongated terminal member having one end fixedly secured to one end of the conductor, means rotatably securing one end of said fluid conduit to said terminal member in fluid-tight relation to permit said terminal member and the conductor secured thereon to rotate relative to said fluid conduit, and a fluid passage extending into the terminal member from the end opposite said one end and communicating with the fluid passage between said conduit and said conductor.

5. The invention according to claim 4 including means to limit the relative rotation between said terminal member and said fluid conduit.

6. A swivel coupling for use with a concentric cable including a torsionally resilient electric cable disposed coaxially within a flexible fluid conduit comprising an elongated terminal member of electrical conducting material having means at one end thereof for attaching said electric cable thereto, a first cylindrical portion extending from said one end, a second portion having a cylindrical outer surface and having a diameter greater than the diameter of said first portion, a transition portion extending between said first and said second portions, an axial bore extending into said terminal member from the end opposite said one end and terminating within said transition portion, a sleeve rotatably mounted on said cylindrical outer surface in fluid-tight relation and surrounding said transition portion, an axial extension on said sleeve having a reduced internal and external diameter, the inner surface of said extension surrounding a part of said first portion of said terminal member in spaced relation thereto to define a fluid passage therebetween and the outer surface of said extension adapted to receive said fluid conduit in fluid-tight relation, and passage means extending from said fluid passage to said bore.

References Cited by the Examiner
UNITED STATES PATENTS

| | | | |
|---|---|---|---|
| 1,548,204 | 8/1925 | Moesta | 174—15 X |
| 1,589,845 | 6/1926 | Faeth | 174—86 X |
| 1,882,320 | 10/1932 | Hapgood | 339—16 |
| 2,525,086 | 10/1950 | Wright et al. | 174—47 X |
| 2,701,818 | 2/1955 | Tims | 174—47 X |
| 3,125,649 | 3/1964 | Cyr | 339—16 X |

JOHN F. BURNS, *Primary Examiner.*

JOHN P. WILDMAN, LARAMIE E. ASKIN,
*Examiners.*